(12) United States Patent
Sumikawa

(10) Patent No.: US 9,131,437 B2
(45) Date of Patent: Sep. 8, 2015

(54) WIRELESS BASE STATION, REFERENCE SIGNAL SUPPLY DEVICE, AND WIRELESS BASE STATION SYSTEM

(75) Inventor: Yukie Sumikawa, Daito (JP)

(73) Assignee: KYOCERA CORPORATION, Kyoto (JP)

( * ) Notice: Subject to any disclaimer, the term of this patent is extended or adjusted under 35 U.S.C. 154(b) by 230 days.

(21) Appl. No.: 13/498,701

(22) PCT Filed: Sep. 17, 2010

(86) PCT No.: PCT/JP2010/066124
§ 371 (c)(1),
(2), (4) Date: May 31, 2012

(87) PCT Pub. No.: WO2011/037076
PCT Pub. Date: Mar. 31, 2011

(65) Prior Publication Data
US 2012/0243529 A1    Sep. 27, 2012

(30) Foreign Application Priority Data

Sep. 28, 2009   (JP) ................................ 2009-223061

(51) Int. Cl.
*H04W 56/00* (2009.01)
*G01S 19/14* (2010.01)
*H04W 52/14* (2009.01)
(Continued)

(52) U.S. Cl.
CPC ........... *H04W 56/0015* (2013.01); *G01S 19/14* (2013.01); *H04W 52/143* (2013.01); *H04J 3/0658* (2013.01); *H04W 52/0206* (2013.01)

(58) Field of Classification Search
CPC ................ H04W 52/0206; H04W 56/0015; H04L 12/66; H04L 27/2662; H04L 5/0048
USPC ................. 370/328, 350, 352; 455/402, 450; 375/354; 340/426.19, 539.13
See application file for complete search history.

(56) References Cited

U.S. PATENT DOCUMENTS

| 6,678,258 | B1 | 1/2004 | Capurka et al. |
| 2001/0012760 | A1* | 8/2001 | Avis ............................. 455/13.2 |
| 2002/0054611 | A1* | 5/2002 | Seta ............................. 370/503 |

(Continued)

FOREIGN PATENT DOCUMENTS

| JP | A-2000-232688 | 8/2000 |
| JP | A-2002-164837 | 6/2002 |

(Continued)

OTHER PUBLICATIONS

Apr. 11, 2012 Translation of International Preliminary Report on Patentability issued in International Patent Application No. PCT/JP2010/066124.

(Continued)

*Primary Examiner* — Curtis A Alia
*Assistant Examiner* — Emmanuel Maglo
(74) *Attorney, Agent, or Firm* — Oliff PLC

(57) ABSTRACT

A PLL circuit of a wireless base station receives a reference signal for synchronization, transmitted from a GPS unit to generate a synchronizing signal in synchronization with the reference signal. A GPS state management unit transmits state information representing a state of the GPS unit to an EMS as the state information of a device supplying a reference signal, mounted on its own device, according to SNMP that is a standard management protocol.

12 Claims, 5 Drawing Sheets

(51) Int. Cl.
*H04J 3/06* (2006.01)
*H04W 52/02* (2009.01)

(56) References Cited

U.S. PATENT DOCUMENTS

| | | | |
|---|---|---|---|
| 2002/0094823 A1* | 7/2002 | Suzuki et al. | 455/456 |
| 2004/0213367 A1* | 10/2004 | Han | 375/354 |
| 2005/0276232 A1 | 12/2005 | Ito et al. | |
| 2006/0172742 A1* | 8/2006 | Chou et al. | 455/450 |
| 2007/0105549 A1 | 5/2007 | Suda et al. | |
| 2008/0214140 A1* | 9/2008 | Caveney et al. | 455/402 |
| 2009/0207042 A1* | 8/2009 | Park et al. | 340/870.02 |
| 2010/0074180 A1* | 3/2010 | Palanki et al. | 370/328 |
| 2010/0216481 A1* | 8/2010 | Gormley | 455/450 |
| 2012/0082188 A2* | 4/2012 | Nicholls et al. | 375/145 |

FOREIGN PATENT DOCUMENTS

| | | |
|---|---|---|
| JP | A-2004-328751 | 11/2004 |
| JP | A-2005-354426 | 12/2005 |
| WO | WO 2005/051024 A1 | 6/2005 |

OTHER PUBLICATIONS

Ichikawa et al., "Implementation of High Quality Clock Network System Supporting Network Lifeline," *NTT Gijutsu Journal*, Mar. 1, 2009, pp. 42-45, vol. 21, No. 3, The Telecommunications Association (with translation).

Nov. 22, 2010 International Search Report issued in International Patent Application No. PCT/JP2010/066124 (with translation).

Sep. 7, 2013 Office Action issued in Japanese Patent Application No. 2009-223061.

Statement of Relevance of Non-English References.

* cited by examiner

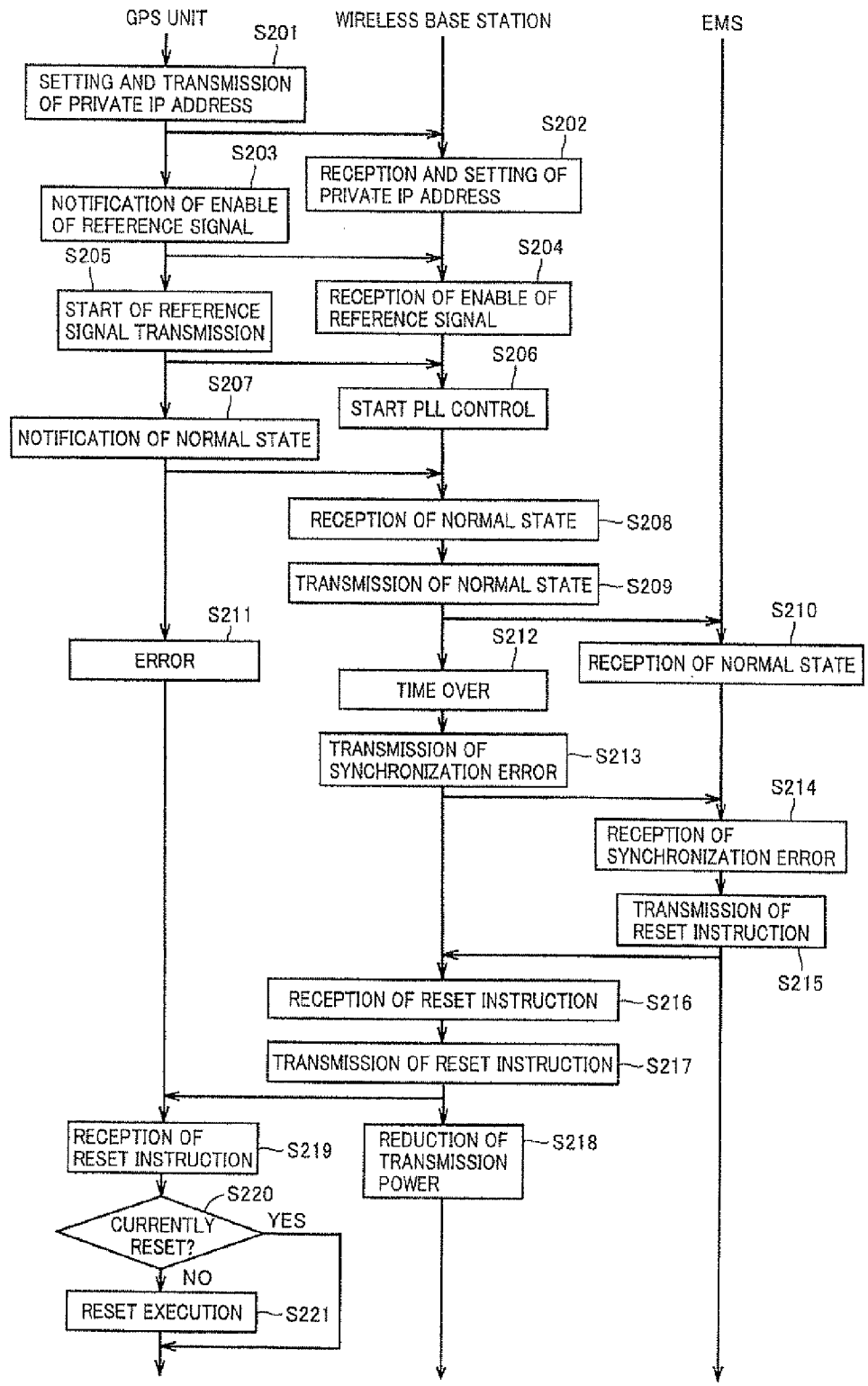

WIRELESS BASE STATION, REFERENCE SIGNAL SUPPLY DEVICE, AND WIRELESS BASE STATION SYSTEM

TECHNICAL FIELD

The present invention relates to a wireless base station, a reference signal supply device, and a wireless base station system, particularly a configuration and method for a plurality of wireless base stations to operate in synchronization.

BACKGROUND ART

Conventionally in a wireless communication system of the cell scheme, synchronization of the transmission and reception timing is established between adjacent cells. More specifically, the transmission and reception timing between a wireless base station in a cell and a terminal device in that cell is made to match the transmission and reception timing between a wireless base station in an adjacent cell and a terminal device in that adjacent cell to suppress the interference between a wireless base station and a terminal device in the adjacent cell as well as the interference between terminal devices.

One approach to realize synchronization of the transmission and reception timing between such cells is to use a signal from a satellite including time information. As a typical example of a signal from a satellite including time information, a GPS (Global Positioning System) signal from a GPS satellite is known at the present time. Specifically, a GPS receiver for receiving a GPS signal from a GPS satellite is provided at each of wireless base stations to establish synchronization of the transmission and reception timing based on the common GPS signal.

A GPS module for generating a synchronizing signal of high accuracy is costly. One approach of reducing the cost is to share one independent GPS receiver among a plurality of wireless base stations. For example, Japanese Patent Laying-Open No. 2000-232688 (PTL 1) discloses a system having each base station integrated with a GPS receiver. In this system, the GPS receiver receives a GPS signal from a GPS satellite, and the GPS signal (reference signal) is employed as a common time basis among the plurality of wireless base stations.

In order to monitor the state of the GPS receiver, an EMS (Element Management System) is installed. A conventional EMS is a management server for monitoring and controlling, based on state information representing a normal state or an error state transmitted from the GPS receiver incorporated in a wireless base station. The EMS monitors and controls a wireless base station based on SNMP (Simple Network Management Protocol) that is a standard management protocol.

CITATION LIST

Patent Literature

PTL 1: Japanese Patent Laying-Open No. 2000-232688

SUMMARY OF INVENTION

Technical Problem

In the case where the management server directly monitors and controls an independent GPS receiver that is shared, a global IP (Internet Protocol) address must be applied to that GPS receiver. This is because, for connecting a shared independent GPS receiver with the EMS, connection via a switch of layer 3 is required. In an environment where the global IP address is of shortage, it is not preferable to apply a global IP address to a GPS receiver that is just providing a reference signal for synchronization.

Furthermore, in the case where the management server directly monitors and controls an independent GPS receiver, a function to monitor and control an independent GPS receiver must be added to the EMS.

In view of the foregoing, an object of the present invention is to provide a wireless base station, a reference signal supply device, and a wireless base station system that can monitor and control the state of a shared independent GPS receiver without having to apply a global IP address to the shared independent GPS receiver, and without having to add a function for monitoring and controlling the shared independent GPS receiver to the EMS.

Solution to Problem

To solve the problem set forth above, a wireless base station of the present invention includes a synchronization control circuit receiving a reference signal for synchronization, transmitted from a reference signal supply device, and generating a synchronizing signal in synchronization with the reference signal; and a supply source state management unit transmitting, according to a standard management protocol, state information representing the state of the reference signal supply device to a management server as the state information of a device supplying a reference signal mounted on its own device.

Preferably, the reference signal supply device transmits state information representing the state of its own device at a predetermined cycle according to a unique protocol. The supply source state management unit transmits to the management server, when state information is not received within the predetermined cycle from the reference signal supply device, state information indicating that the reference signal supply device is in an error state as the state information of the device supplying a reference signal mounted on its own device according to the standard management protocol.

Preferably, the reference signal supply device transmits state information representing its own state according to the unique protocol. The supply source state management unit transmits to the management server, when state information indicating that the reference signal supply device is in an error state, transmitted from the reference signal supply device according to the unique protocol is received, state information indicating that the reference signal supply device is in an error state as the state information of the device supplying a reference signal mounted on its own device according to the standard management protocol.

Preferably, the wireless base station further includes a supply source control unit transmitting, when a reset instruction of the device supplying a reference signal mounted on its own device, transmitted according to the standard management protocol from the management server is received, a reset instruction to the reference signal supply device according to the unique protocol.

Preferably, the wireless base station further includes a power control unit reducing transmission power of a wireless signal when the reset instruction is received.

Preferably, the management server and wireless base station have a global IP address set, and the standard management protocol is SNMP.

A reference signal supply device of the present invention is connected to a plurality of wireless base stations, and includes a reference signal generation unit generating and supplying a reference signal to a plurality of wireless base stations, and a state management unit transmitting, according to a unique protocol, information representing the state of its own device to at least one wireless base station.

Preferably, the reference signal supply device further includes an address management unit applying a private IP address to at least one wireless base station and its own device, and notifying at least one wireless base station about the applied private IP address.

Preferably, the reference signal supply device further includes a reset control unit executing reset of its own device when a reset instruction transmitted according to the unique protocol is received from at least one wireless base station.

Preferably, the reset control unit ignores, when a new reset instruction transmitted according to the unique protocol is received from at least one wireless base station during execution of its own reset, the new reset instruction.

The present invention is directed to a wireless base station system including a plurality of wireless base stations, and a reference signal supply device supplying a reference signal for synchronization to the plurality of wireless base stations. The reference signal supply device includes a reference signal generation unit generating and supplying a reference signal to a plurality of wireless base stations, and a state management unit transmitting information representing a state of its own device to at least one wireless base station according to a unique protocol. At least one wireless base station includes a synchronization control unit receiving a reference signal for synchronization, transmitted from the reference signal supply device for generating a synchronizing signal in synchronization with the reference signal, and a supply source state management unit transmitting, according to a standard management protocol, state information representing the state of the reference signal supply device to a management server as state information of the device supplying a reference signal mounted on its own device.

Advantageous Effects of Invention

According to the present invention, the state of a shared independent GPS receiver can be monitored and controlled without having to apply a global IP address to the shared independent GPS receiver, and without having to add a function for monitoring and controlling the shared independent GPS receiver to the EMS.

BRIEF DESCRIPTION OF DRAWINGS

FIG. 5 represents another example of operations of a GPS unit, wireless base station, and EMS according to an embodiment of the present invention.

DESCRIPTION OF EMBODIMENTS

Embodiments of the present invention will be described hereinafter with reference to the drawings.

(Configuration of Wireless Base Station System)

Figure 1:
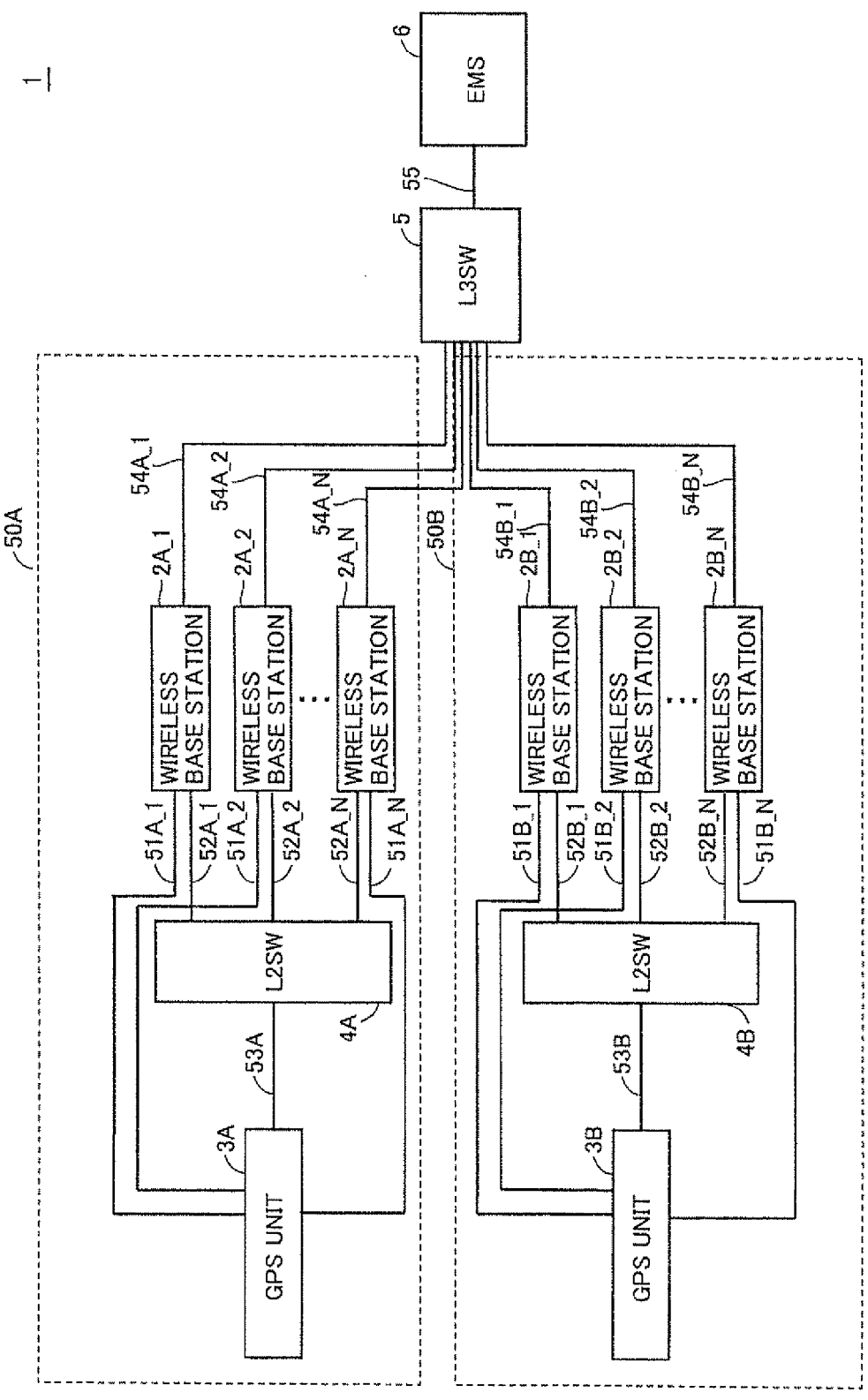
FIG. 1 represents a configuration of a wireless base station system according to an embodiment of the present invention.

FIG. 1 represents a configuration of a wireless base station system according to an embodiment of the present invention.

Referring to FIG. 1, a wireless base station system 1 includes a plurality of domains 50A and 50B.

Domain 50A includes one GPS unit 3A, and a plurality of wireless base stations 2A_1 to 2A_N connected to GPS unit 3A via communication cables 51A_1 to 51A_N.

A reference signal is supplied from GPS unit 3A to a plurality of wireless base stations 2A_1 to 2A_N in domain 50A via communication cables 51A_1 to 51A_N. Accordingly, wireless base stations 2A_1 to 2A_N in domain 50A operate in synchronization with the received reference signal.

GPS unit 3A is also connected to a layer 2 switch (L2SW) 4A and the Ethernet (registered trademark) 53A. Layer 2 switch (L2SW) 4A is connected to wireless base stations 2A_1 to 2A_N via Ethernet 52A_1 to 52A_N. Layer 2 switch (L2SW) 4A is a switch belonging to layer 2 (data link layer) of an OSI (Open Systems Interconnection) reference model. Information for management and control according to a unique protocol using a private IP address is transferred between GPS unit 3A and wireless base stations 2A_1 to 2A_N connected through Layer 2 switch (L2SW) 4A.

Similarly, a domain 50B includes one GPS unit 3B, and a plurality of wireless base stations 2B_1 to 2B_N connected to GPS unit 3B via communication cables 51B_1 to 51B_N.

A reference signal is supplied from GPS unit 3B to a plurality of wireless base stations 2B_1 to 2B_N in domain 50B via communication cables 51B_1 to 51B_N. Accordingly, wireless base stations 2B_1 to 2B_N in domain 50B operate in synchronization with the received reference signal.

GPS unit 3B is also connected to a layer 2 switch (L2SW) 4B and the Ethernet (registered trademark) 53B, Layer 2 switch (L2SW) 4B is connected to wireless base stations 2B_1 to 2B_N via Ethernet 52B_1 to 52B_N. Layer 2 switch (L2SW) 4B is a switch belonging to layer 2 (data link layer) of an OK reference model. Information for management and control according to a unique protocol using a private IP address is transferred between GPS unit 3B and wireless base stations 2B_1 to 2B_N connected through Layer 2 switch (L2SW) 4B.

Wireless base stations 2A_1 to 2A_N and 21B_1 to 2B_N are further connected to a layer 3 switch (L3SW) 5 via Ethernet (registered trademark) 54A_1 to 54A_N and 54B_1 to 54B_N. Layer 3 switch (L3SW) 5 is further connected to an EMS 6 that is a management server via Ethernet (registered trademark) 55.

Layer 3 switch (L3SW) is a switch belonging to layer 3 (network layer) at an OSI reference model. Information for management and control according to SNMP using a global IP address is transferred between EMS 6 and wireless base stations 2A_1 to 2A_N and 2B_1 to 2B_N connected through layer 3 switch (L3SW) 5.

In the description hereinafter, GPS units 3A and 3B may be generically referred to as GPS unit 3, and wireless base stations 2A_1 to 2A_N and 2B_1 to 2B_N may be generically referred to as wireless base station 2, (Configuration of GPS Unit 3)

Figure 2:
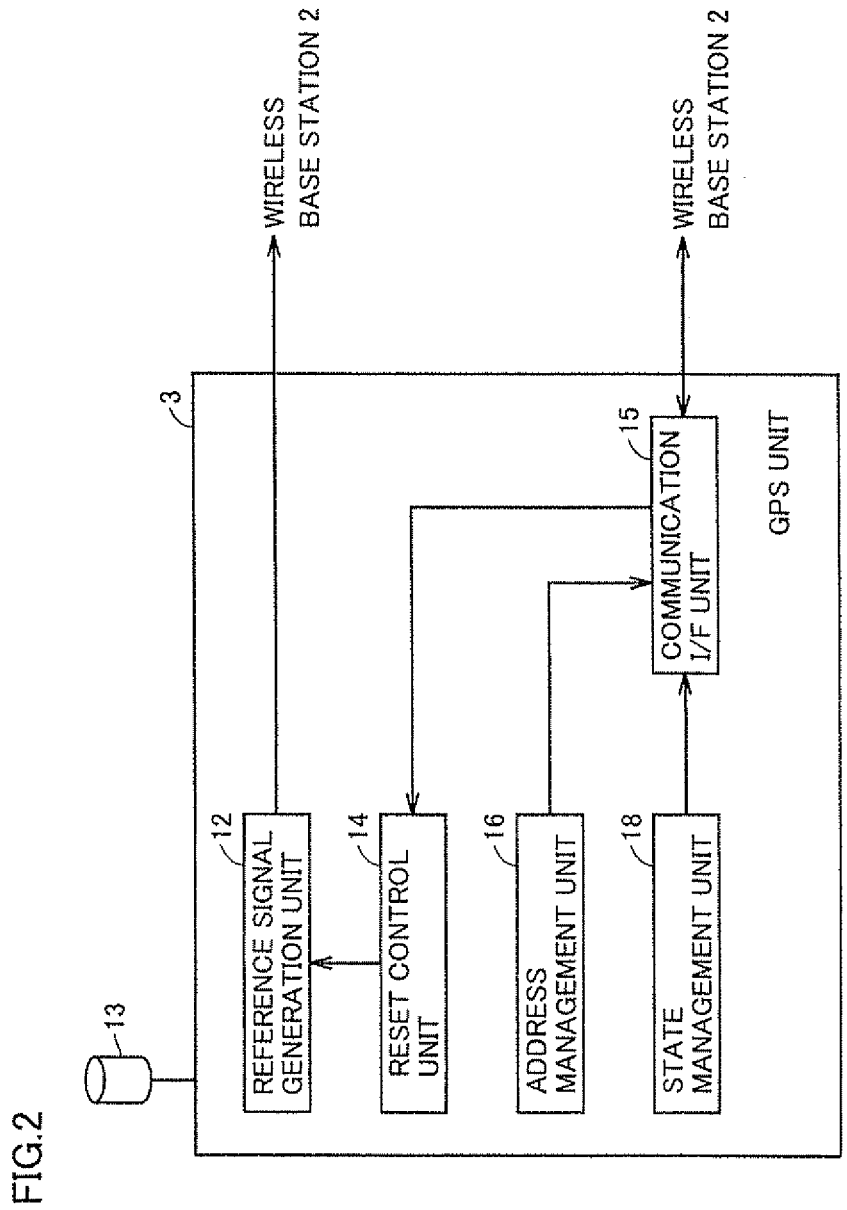
FIG. 2 represents a configuration of a GPS unit according to an embodiment of the present invention.

FIG. 2 represents a configuration of GPS unit 3 according to an embodiment of the present invention.

Referring to FIG. 2, GPS unit 3 includes an antenna 13, a reference signal generation unit 12, a reset control unit 14, an address management unit 16, a state management unit 18, and a communication I/F unit 15.

Antenna 13 receives a GPS signal from a GPS satellite.

Reference signal generation unit 12 generates and transmits to a plurality of wireless base stations 2 a reference signal that is a timing signal, at a predetermined cycle based on the time information included in the received GPS signal.

Address management unit 16 applies a private IP address to its own device (GPS unit 3) and each of wireless base stations 2. Address management unit 16 stores and manages the applied private IP address, and notifies wireless base stations 2 about the set private IP address via communication I/F unit 15.

State management unit 18 transmits the state information of its own device according to a unique protocol at every elapse of a constant transmission cycle.

When supply of a reference signal is enabled as a result of capture of a signal from a GPS satellite being allowed, state management unit 18 transmits information indicating that the reference signal is enabled to wireless base stations 2 according to the unique protocol.

Further, state management unit 18 transmits, when the state of its own device is normal, state information indicating that its own device is in a normal state to wireless base stations 2 according to the unique protocol.

Further, state management unit 18 transmits, when attaining a hold over state in which a signal from the GPS satellite cannot be captured, state information indicating that its own device is in a hold over state that is one type of an error state to wireless base stations 2.

Reset control unit 14 executes reset of its own device when receiving a reset instruction transmitted according to the unique protocol. When a new reset instruction is received during execution of reset, reset control unit 14 rejects that reset instruction.

Communication I/F unit 15 transmits and receives information to and from wireless base station 2 according to the unique protocol using the private IP address.

(Configuration of Wireless Base Station).

Figure 3:
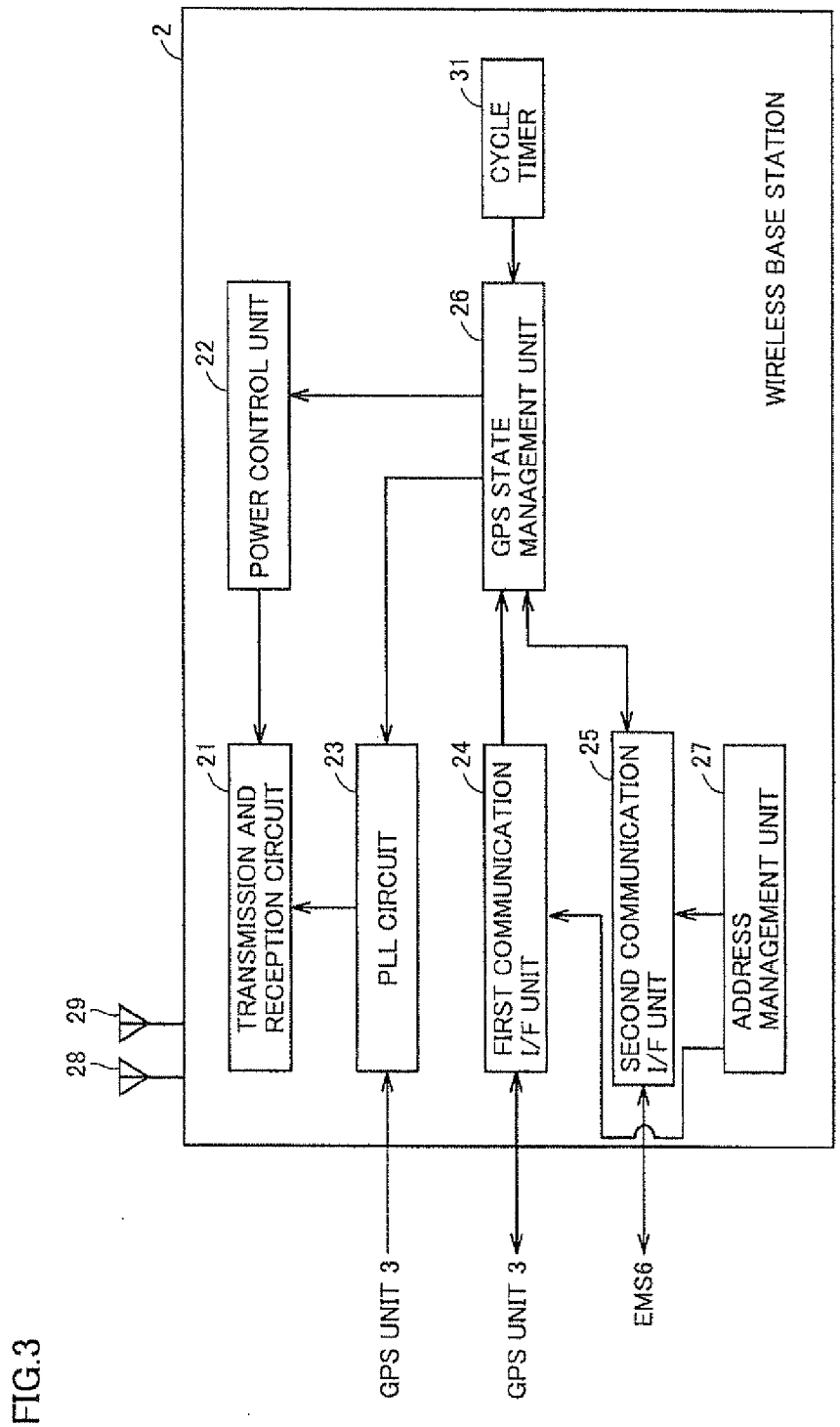
FIG. 3 represents a configuration of a wireless base station according to an embodiment of the present invention.

FIG. 3 represents a configuration of a wireless base station according to an embodiment of the present invention.

Referring to FIG. 3, wireless base station 2 includes antennas 28 and 29, a transmission and reception circuit 21, a PLL circuit 23, a first communication I/F unit 24, a second communication I/F unit 25, an address management unit 27, a GPS state management unit 26, a power control unit 22, and a cycle timer 31.

Antennas 28 and 29 receive and transmit a wireless signal from and to a wireless terminal.

PLL circuit 23 generates, in addition to feedback control based on a reference signal transmitted periodically from GPS unit 3, a synchronizing signal in synchronization with the phase of the reference signal.

Transmission and reception circuit 21 applies a reception process on a signal from a wireless terminal output from antennas 28 and 29, and applies a transmission process on a signal output to a wireless terminal via antennas 28 and 29. Transmission and reception circuit 21 includes, for example, a coding circuit, a modulation circuit, a decoding circuit, a demodulation circuit, an MIMO (Multi In Multi Output) signal processing unit, and the like. Transmission and reception circuit 21 carries out the transmission and reception process according to a synchronizing signal output from PLL circuit 23.

First communication I/F unit 24 transfers information with GPS unit 3 according to the unique protocol using a private IP address.

Second communication I/F unit 25 transfers information with EMS 6 according to SNMP that is a standard protocol using a global IP address. SNMP is a protocol for monitoring and controlling, through the network, a communication apparatus connected on the network of TCP/IP (Transmission Control Protocol/Internet Protocol).

Address management unit 27 receives a private IP address of GPS unit 3 transmitted from GPS unit 3 and a private IP address of its own device (wireless base station) to store and manage the received private IP addresses, Address management unit 27 further manages the global IP address of its own device and of EMS 6.

Cycle timer 31 notifies GPS state management unit 26 of an elapse of a transmission cycle of state information from GPS unit 3, at every elapse of the transmission cycle.

GPS state management unit 26 receives information indicating that the reference signal transmitted from GPS unit 3 is enabled according to the unique protocol.

When state information indicating that GPS unit 3 is in a normal state, transmitted from GPS unit 3 according to the unique protocol, is received, GPS state management unit 26 transmits to EMS 6 state information indicating that GPS unit 3 is in a normal state according to SNMP as the state information of the GPS receiver mounted on its own device.

When state information indicating that GPS unit 3 is in a hold over state that is one type of an error state, transmitted from GPS unit 3 according to the unique protocol, is received, GPS state management unit 26 transmits to EMS 6 state information indicating that GPS unit 3 is in a hold over state according to SNMP as the state information of the GPS receiver mounted on its own device.

Upon receiving an instruction to reset the GPS receiver mounted on its own device, transmitted from EMS 6 according to SNMP, GPS state management unit 26 transmits a reset instruction to GPS unit 3 according to the unique protocol.

When the state information is not received from GPS unit 3 at the point in time of receiving notification of an elapse of the state information transmission cycle from cycle timer 31, GPS state management unit 26 transmits to EMS 6 state information indicating that GPS unit 3 is in a synchronization error state that is one type of an error state according to SNMP as the state information of the GPS receiver mounted on its own device.

Power control unit 22 reduces the transmission power of a wireless signal when a reset instruction is received from EMS 6. Accordingly, the area of coverage is reduced to minimize interference with a signal from another wireless base station and wireless terminal.

(Operation Example 1)

Figure 4:
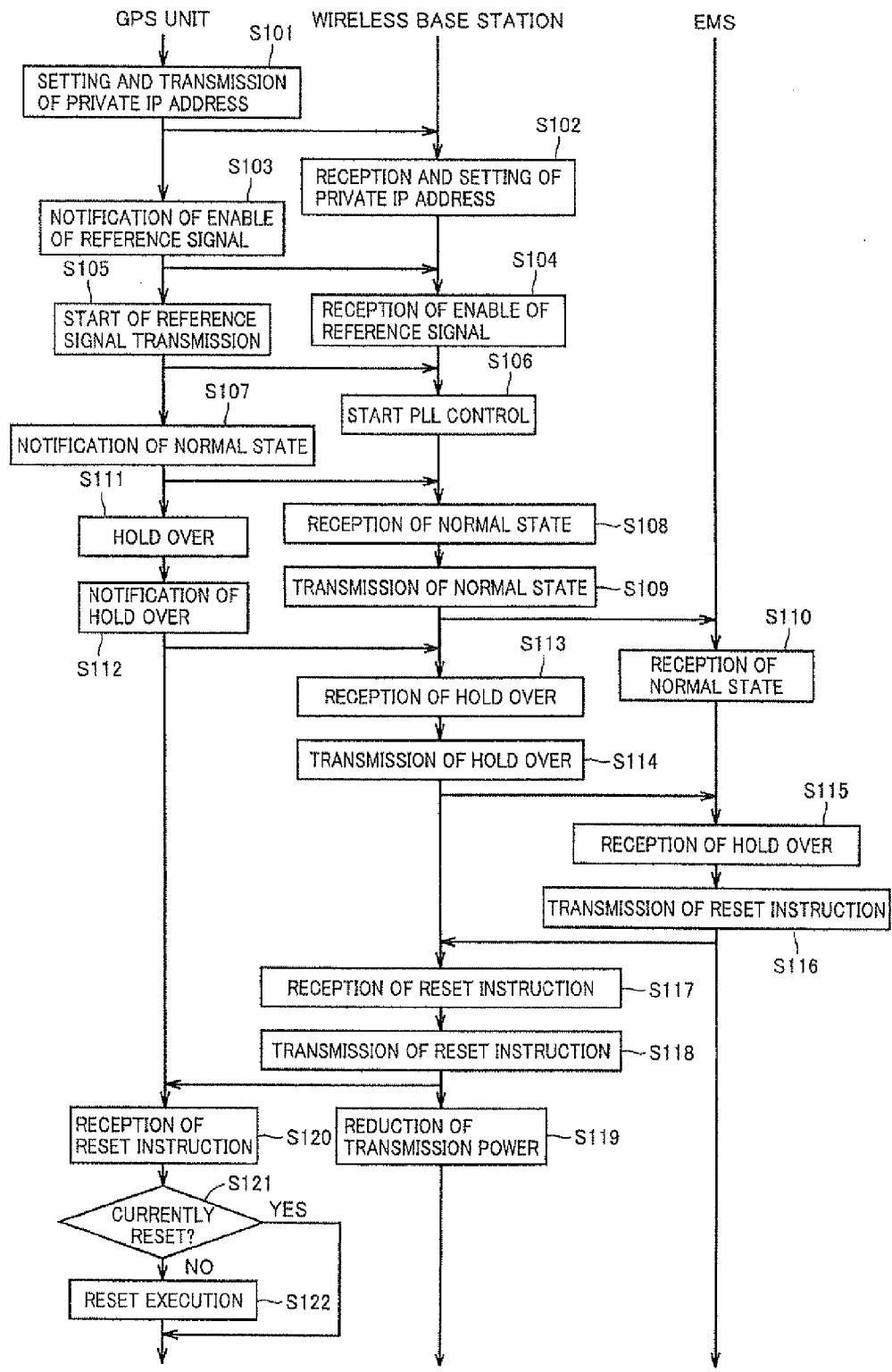
FIG. 4 represents an example of operations of a GPS unit, wireless base station, and EMS according to an embodiment of the present invention.

FIG. 4 represents an example of operations of GPS unit 3, wireless base station 2, and EMS 6 according to an embodiment of the present invention. In FIG. 4, the operation of wireless base station 2 is typical of any one of a plurality of wireless base stations 2.

First, address management unit 16 of GPS unit 3 applies a private IP address to its own device (GPS unit 3) and each of wireless base stations 2. Address management unit 16 stores and manages the applied private IP addresses. Address management unit 16 notifies, through communication I/F unit 15, a plurality of wireless base stations 2 about its own private IP address and the private IP address of the relevant wireless base station 2 set (step S101).

Address management unit 27 of wireless base station 2 receives, through first communication I/F unit 24, the private IP address of GPS unit 3 and the private IP address of its own device (wireless base station 2) to hold and manage the received private IP addresses (step S102).

Then, state management unit 18 of GPS unit 3 transmits, when supply of a reference signal is enabled as a result of capture of the signal from a GPS satellite being allowed, information indicating that the reference signal is enabled to a plurality of wireless base stations 2 via communication I/F unit 15 according to the unique protocol (step S103).

GPS state management unit 26 of wireless base station 2 receives, through first communication I/F unit 24, information indicating that the reference signal is enabled, transmitted according to the unique protocol (step S104).

Reference signal generation unit 12 of GPS unit 3 initiates generation of a reference signal to transmit the generated reference signal to wireless base stations 2 (step S105).

PLL circuit 23 of wireless base stations 2 receives a reference signal to generate a synchronizing signal in synchronization with the phase of the reference signal. Accordingly, transmission and reception circuit 21 operates according to a synchronizing signal output from PLL circuit 23 (step S106).

When its own device is in a normal state, state management unit 18 of GPS unit 3 transmits to wireless base stations 2 through communication I/F unit 15 the state information indicating that its own device is in a normal state according to the unique protocol at a constant cycle (step S107).

GPS state management unit 26 of wireless base station 2 receives, through first communication I/F unit 24, the state information indicating that GPS unit 3 is in a normal state, transmitted according to the unique protocol (step S108).

GPS state management unit 26 of wireless base station 2 transmits to EMS 6 according to SNMP, state information indicating that GPS unit 3 is in a normal state through second communication I/F unit 25 as the state information of the GPS receiver mounted on its own device (step S109)

EMS 6 receives state information indicating that the GPS receiver mounted on wireless base station 2 is in a normal state, transmitted according to SNMP (step S110).

When in a hold over state in which a signal from the GPS satellite cannot be captured (step S111), state management unit 18 of GPS unit 3 transmits to wireless base stations 2 through communication I/F unit 15 state information indicating that its own device is in a hold over state according to the unique protocol (step S112).

Then, GPS state management unit 26 of wireless base station 2 receives through first communication I/F unit 24 state information indicating that GPS unit 3 is in a hold over state, transmitted according to the unique protocol (step S113).

GPS state management unit 26 of wireless base station 2 transmits, through second communication I/F unit 25, state information indicating that GPS unit 3 is in a hold over state to EMS 6 as the state information of the GPS receiver mounted on its own device according to SNMP (step S114).

EMS 6 receives state information indicating that the GPS receiver mounted at wireless base station 2 is in a hold over state, transmitted according to SNMP (step S115).

EMS 6 transmits to wireless base station 2 from which the state information indicating that the GPS receiver is in a hold over state was transmitted an instruction to reset the GPS receiver according to SNMP (step S116).

GPS state management unit 26 of wireless base station 2 receives, through second communication I/F unit 25, an instruction to reset the GPS receiver, transmitted according to SNMP (step S117).

GPS state management unit 26 of wireless base station 2 transmits to GPS unit 3 a reset instruction according to the unique protocol through first communication I/F unit 24 (step S118).

Power control unit 22 of wireless base station 2 reduces the transmission power of a wireless signal output from transmission and reception circuit 21 according to an instruction from GPS state management unit 26 (step S119).

Reset control unit 14 of GPS unit 3 receives through communication I/F unit 15 a reset instruction transmitted according to the unique protocol (step S120).

When reset is not currently executed (NO at step S121), reset control unit 14 executes reset (step S122). Reset control unit 14 ignores any newly received reset instruction when the reset is currently executed (YES at step S121).

(Operation Example 2)

FIG. 5 represents another example of the operations of GPS unit 3, wireless base station 2, and EMS 6 according to an embodiment of the present invention. In FIG. 5, the operation of wireless base station 2 is typical of any one of a plurality of wireless base stations 2.

First, address management unit 16 of GPS unit 3 applies a private IP address to its own device (GPS unit 3) and each of wireless base stations 2. Address management unit 16 stores and manages the applied private IP addresses. Address management unit 16 notifies, through communication I/F unit 15, wireless base stations 2 about its own private IP address and the private IP address of the relevant wireless base station 2 set (step S201).

Address management unit 27 of wireless base station 2 receives through first communication I/F unit 24 the private IP address of GPS unit 3 and the private IP address of its own device (wireless base station 2) to store and manage the received private IP addresses (step S202).

Then, state management unit 18 of GPS unit 3 transmits, when supply of a reference signal is enabled as a result of capture of a signal from the GPS satellite being allowed, information indicating that the reference signal is enabled to wireless base stations 2 through communication I/F unit 15 according to the unique protocol (step S203).

GPS state management unit 26 of wireless base station 2 receives through first communication I/F unit 24 information indicating that the reference signal is enabled, transmitted according to the unique protocol (step S204).

Reference signal generation unit 12 of GPS unit 3 initiates generation of a reference signal to transmit the generated reference signal to wireless base stations 2 (step S205).

PLL circuit 23 of wireless base station 2 receives a reference signal to generate a synchronizing signal in synchronization with the phase of the reference signal. Accordingly, transmission and reception circuit 21 operates according to a synchronizing signal output from PLL circuit 23 (step S206).

When its own device is in a normal state, state management unit 18 of GPS unit 3 transmits to wireless base stations 2 through communication I/F unit 15 the state information indicating that its own device is in a normal state according to the unique protocol at a constant cycle (step S207).

GPS state management unit 26 of wireless base station 2 receives through first communication I/F unit 24 the state information indicating that GPS unit 3 is in a normal state, transmitted according to the unique protocol (step S208).

GPS state management unit 26 of wireless base station 2 transmits to EMS 6 according to SNMP, state information indicating that GPS unit 3 is in a normal state through second communication I/F unit 25 as the state information of the GPS receiver mounted on its own device (step S209).

EMS 6 receives state information indicating that the GPS receiver mounted on wireless base station 2 is in a normal state, transmitted according to SNMP (step S210).

In the case where a reference signal could not be transmitted due to an error at GPS unit 3 (step S211), GPS state management unit 26 of wireless base station 2 receives notification of an elapse of a state information transmission cycle from cycle timer 31 to detect that the state information has not been received within a state information transmission cycle from the reception of the previous state information (step S212).

GPS state management unit 26 of wireless base station 2 transmits through second communication I/F unit 25 state information indicating that GPS unit 3 is in a synchronization error state to EMS 6 as the state information of the GPS receiver mounted on its own device (step S213).

EMS 6 receives state information indicating that the GPS receiver mounted at wireless base station 2 is in a synchronization error state, transmitted according to SNMP (step S214).

EMS 6 transmits to wireless base station 2 from which the state information indicating that the GPS receiver is in a synchronization error state was transmitted an instruction to reset the GPS receiver according to SNMP (step S215).

GPS state management unit 26 of wireless base station 2 receives through second communication I/F unit 25 an instruction to reset the GPS receiver, transmitted according to SNMP (step S216).

Power control unit 22 of wireless base station 2 reduces the transmission power of a wireless signal transmitted from transmission and reception circuit 21 according to an instruction from GPS state management unit 26 (step S217).

GPS state management unit 26 of wireless base station 2 transmits to GPS unit 3 through first communication I/F unit 24 a reset instruction according to the unique protocol (step S218).

Reset control unit 14 of GPS unit 3 receives through communication I/F unit 15 a reset instruction transmitted according to the unique protocol (step S219).

When reset is not currently being executed (NO at step S220), reset control unit 14 executes reset (step S221). Reset control unit 14 ignores any newly received reset instruction when currently in execution of the reset (NO at step S220).

Thus, according to an embodiment of the present invention, information for management and control is transmitted between a wireless base station and a shared independent GPS unit by a unique protocol using a private IP address. The wireless base station transmits information for management and control of a GPS unit to the EMS as the information of the GPS receiver mounted on its own device. Accordingly, a global IP address does not have to be applied to the GPS unit since information for management and control does not have to be directly transmitted between the GPS unit and EMS. Furthermore, a function to monitor and control the GPS unit does not have to be added to the EMS.

(Modification)

The present invention is not limited to the embodiment set forth above, and may include a modification as set forth below.

(1) Wireless Base Station Managing GPS Unit

The present invention is not limited to an embodiment in which all wireless base stations whose one GPS unit is supplying a reference signal have a private IP address, and in which the state information and reset instruction are transmitted with respect to the GPS unit according to a unique protocol.

The management function may be applied to at least only one of the plurality of wireless base stations receiving a reference signal from a GPS unit.

In other words, at least one wireless base station has a private IP address, and the state information and reset instruction are transmitted according to a unique protocol with respect to the GPS unit.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

Reference Signs List

1 wireless base station system; 2, 2A_1 to 2A_N, 2B_1 to 2B_N wireless base station; 3, 3A, 3B, GPS unit; 4A, 4B layer 2 switch; 5 layer 3 switch; 6 EMS; 12 reference signal generation unit; 13, 28, 29 antenna; 14 reset control unit; 15 communication I/F unit; 16, 27 address management unit; 18 state management unit; 21 transmission and reception circuit; 22 power control unit; 23 PLL circuit; 24 first communication I/F unit; 25 second communication I/F unit; 26 GPS state control unit; 31 cycle timer; 50A, 50B domain; 51A_1 to 51A_N, 51B_1 to 51B_N communication cable, 52A_1 to 52A_N, 52B_1 to 52B_N, 53A, 53B, 54A_1 to 54A_N, 54B_1 to 54B_N, 55 Ethernet (registered trademark).

The invention claimed is:

1. A wireless base station comprising:
a synchronization control unit receiving a reference signal for synchronization, transmitted from a reference signal supply device, and generating a synchronizing signal in synchronization with said reference signal, and
a supply source state management unit transmitting, according to a standard management protocol, state information representing a state of said reference signal supply device to a management server as the state information of a device supplying a reference signal;
wherein:
between the wireless base station and the reference signal supply device, information for management and control is transmitted according to a unique protocol using a private IP address such that synchronization between the wireless base station and the reference signal supply device occurs using information transmitted via only the private IP address, and
between the wireless base station and the management server, said state information is transmitted according to said standard management protocol using a global IP address.

2. The wireless base station according to claim 1, wherein said reference signal supply device transmits state information representing the state of the reference signal supply device at a predetermined cycle according to the unique protocol, and
when state information is not received within said predetermined cycle from said reference signal supply device, said supply source state management unit transmits to said management server according to said standard management protocol, state information indicating that said reference signal supply device is in an error state as the state information of the device supplying a reference signal.

3. The wireless base station according to claim 1, wherein said reference signal supply device transmits state information representing the state of the reference signal supply device according to the unique protocol, and
said supply source state management unit transmits to said management server according to said standard management protocol, when state information indicating that said reference signal supply device is in an error state, transmitted from said reference signal supply device according to the unique protocol is received, state information indicating that said reference signal supply device is in an error state as the state information of the device supplying a reference signal.

4. A wireless base station comprising:
a synchronization control unit receiving a reference signal for synchronization, transmitted from a reference signal supply device, and generating a synchronizing signal in synchronization with said reference signal,
a supply source state management unit transmitting, according to a standard management protocol, state information representing a state of said reference signal supply device to a management server as the state information of a device supplying a reference signal, and
a supply source control unit transmitting, when a reset instruction of said device supplying a reference signal transmitted according to said standard management protocol from the management server is received, a reset instruction according to a unique protocol to said reference signal supply device, the unique protocol using a private IP address such that synchronization between the wireless base station and the reference signal supply device occurs using information transmitted via only the private IP address.

5. The wireless base station according to claim 4, further comprising a power control unit reducing transmission power of a wireless signal when said reset instruction is received.

6. The wireless base station according to claim 1, wherein said management server and said wireless base station have the global IP address set, and said standard management protocol is SNMP.

7. A reference signal supply device connected to a plurality of wireless base stations, comprising:
a reference signal generation unit generating and supplying a reference signal to a plurality of wireless base stations, and
a state management unit transmitting, according to a unique protocol, information representing a state of the state management unit to at least one wireless base station of the plurality of wireless base stations; wherein:
between the at least one wireless base station and the reference signal supply device, information for management and control is transmitted according to a unique protocol using a private IP address such that synchronization between the wireless base station and the reference signal supply device occurs using information transmitted via only the private IP address, and
between the at least one wireless base station and a management server, said state information is transmitted according to said standard management protocol using a global IP address.

8. The reference signal supply device according to claim 7, further comprising an address management unit applying the private IP address to said at least one wireless base station and its own device, and notifying said at least one wireless base station about said applied private IP address.

9. The reference signal supply device according to claim 8, further comprising a reset control unit executing reset of the reset control unit when a reset instruction is received, transmitted according to the unique protocol from said at least one wireless base station.

10. The reference signal supply device according to claim 9, wherein said reset control unit ignores, when a new reset instruction is received, transmitted according to said unique protocol from said at least one wireless base station during execution of reset of the reset control unit, the new reset instruction.

11. A wireless base station system including a plurality of wireless base stations and a reference signal supply device supplying a reference signal for synchronization to said plurality of wireless base stations,
said reference signal supply device including
a reference signal generation unit generating and supplying a reference signal to a plurality of wireless base stations, and
a state management unit transmitting information representing a state of the state management unit to at least one wireless base station of the plurality of wireless base stations according to a unique protocol,
said at least one wireless base station including
a synchronization control circuit receiving a reference signal for synchronization, transmitted from said reference signal supply device, and generating a synchronizing signal in synchronization with said reference signal, and
a supply source state management unit transmitting, according to a standard management protocol, state information representing a state of said reference signal supply device to a management server as the state information of a device supplying a reference signal; wherein:
between the at least one wireless base station and the reference signal supply device, information for management and control is transmitted according to a unique protocol using a private IP address such that synchronization between the wireless base station and the reference signal supply device occurs using information transmitted via only the private IP address, and
between the at least one wireless base station and the management server, said state information is transmitted according to said standard management protocol using a global IP address.

12. The wireless base station according to claim 4, wherein the reset instruction is transmitted in response to the management server reporting state information indicating that a GPS receiver of the wireless base station is in a synchronization error state.

* * * * *